US010502546B2

United States Patent
Chong

(10) Patent No.: US 10,502,546 B2
(45) Date of Patent: Dec. 10, 2019

(54) SYSTEMS AND METHODS FOR VARIABLE-RANGE FOURIER DOMAIN IMAGING

(71) Applicant: SANTEC CORPORATION, Komaki, Aichi (JP)

(72) Inventor: Changho Chong, Los Altos, CA (US)

(73) Assignee: SANTEC CORPORATION, Komaki (JP)

( * ) Notice: Subject to any disclaimer, the term of this patent is extended or adjusted under 35 U.S.C. 154(b) by 94 days.

(21) Appl. No.: 15/806,022

(22) Filed: Nov. 7, 2017

(65) Prior Publication Data

US 2019/0137255 A1 May 9, 2019

(51) Int. Cl.
| | |
|---|---|
| *G01B 9/02* | (2006.01) |
| *G02B 7/02* | (2006.01) |
| *G02B 15/14* | (2006.01) |
| *G02B 26/10* | (2006.01) |

(52) U.S. Cl.
CPC ....... *G01B 9/02091* (2013.01); *G01B 9/0203* (2013.01); *G01B 9/02034* (2013.01); *G01B 9/02049* (2013.01); *G02B 7/023* (2013.01); *G02B 15/14* (2013.01); *G02B 26/10* (2013.01)

(58) Field of Classification Search
CPC .............. G01B 9/02091; G01B 9/0203; G01B 9/02034; G01B 9/02049; G02B 7/023; G02B 15/14; G02B 26/10
USPC .................................................. 356/479, 497
See application file for complete search history.

(56) References Cited

U.S. PATENT DOCUMENTS

| | | | |
|---|---|---|---|
| 4,466,699 | A | 8/1984 | Droessler et al. |
| 5,022,745 | A | 6/1991 | Zayhowski et al. |
| 5,319,668 | A | 6/1994 | Luecke |
| 5,372,135 | A | 12/1994 | Mendelson et al. |
| 5,430,574 | A | 7/1995 | Tehrani |

(Continued)

FOREIGN PATENT DOCUMENTS

| | | |
|---|---|---|
| DE | 10 2011 114 A1 | 4/2013 |
| JP | 2006-202543 A | 8/2006 |

(Continued)

OTHER PUBLICATIONS

Changho Chong, et al. "Large Coherence Length Swept Source for Axial Length Measurement of the Eye." Applied Optics 48:10 (2009): D145-150.

(Continued)

*Primary Examiner* — Tarifur R Chowdhury
*Assistant Examiner* — Jonathon Cook
(74) *Attorney, Agent, or Firm* — Foley & Lardner LLP

(57) ABSTRACT

An optical system includes a light source, an interferometer, and a detector. The interferometer includes a scanner and a lens system disposed downstream of the scanner. The scanner is configured to direct a portion of the optical beam along one of a plurality of different directions within a scanning range. The lens system is configured to project the portion of optical beam to an imaging area defined by a field of view of the optical system, the lens system comprising a first lens, wherein an aspect of the first lens is adjustable so as to render the field of view adjustable without adjusting the scanning range of the scanner. The detector is configured to receive a reflected portion of the optical beam that reflects from an object placed within the imaging area.

20 Claims, 7 Drawing Sheets

(56) References Cited

U.S. PATENT DOCUMENTS

| | | | |
|---|---|---|---|
| 5,537,162 A | 7/1996 | Hellmuth et al. | |
| 5,561,523 A | 10/1996 | Blomberg et al. | |
| 5,979,760 A * | 11/1999 | Freyman | G02B 7/021 |
| | | | 235/454 |
| 5,982,963 A | 11/1999 | Feng et al. | |
| 6,070,093 A | 5/2000 | Oosta et al. | |
| 6,111,645 A | 8/2000 | Tearney et al. | |
| 6,134,003 A | 10/2000 | Tearney et al. | |
| 6,160,826 A | 12/2000 | Swanson et al. | |
| 6,275,718 B1 | 8/2001 | Lempert | |
| 6,282,011 B1 | 8/2001 | Tearney et al. | |
| 6,373,632 B1 | 4/2002 | Flanders | |
| 6,421,164 B2 | 7/2002 | Tearney et al. | |
| 6,485,413 B1 | 11/2002 | Boppart et al. | |
| 6,501,551 B1 | 12/2002 | Tearney et al. | |
| 6,556,853 B1 | 4/2003 | Cabib et al. | |
| 6,564,087 B1 | 5/2003 | Pitris et al. | |
| 6,725,073 B1 | 4/2004 | Motamedi et al. | |
| 7,099,358 B1 | 8/2006 | Chong | |
| 7,231,243 B2 | 6/2007 | Tearney et al. | |
| 7,323,680 B2 | 1/2008 | Chong | |
| 7,324,214 B2 | 1/2008 | De Groot et al. | |
| 7,352,783 B2 | 4/2008 | Chong | |
| 7,382,809 B2 | 6/2008 | Chong et al. | |
| 7,388,891 B2 | 6/2008 | Uehara et al. | |
| 7,400,410 B2 | 7/2008 | Baker et al. | |
| 7,414,779 B2 | 8/2008 | Huber et al. | |
| 7,428,057 B2 | 9/2008 | De Lega et al. | |
| 7,489,713 B2 | 2/2009 | Chong et al. | |
| 7,701,588 B2 | 4/2010 | Chong | |
| 7,725,169 B2 | 5/2010 | Boppart et al. | |
| 7,835,010 B2 | 11/2010 | Morosawa et al. | |
| 7,865,231 B2 | 1/2011 | Tearney et al. | |
| 7,869,057 B2 | 1/2011 | De Groot | |
| 7,884,945 B2 | 2/2011 | Srinivasan et al. | |
| 7,961,312 B2 | 6/2011 | Lipson et al. | |
| 8,036,727 B2 | 10/2011 | Schurman et al. | |
| 8,115,934 B2 | 2/2012 | Boppart et al. | |
| 8,315,282 B2 | 11/2012 | Huber et al. | |
| 8,405,834 B2 | 3/2013 | Srinivasan et al. | |
| 8,500,279 B2 | 8/2013 | Everett et al. | |
| 8,625,104 B2 | 1/2014 | Izatt et al. | |
| 8,690,328 B1 | 4/2014 | Chong | |
| 8,690,330 B2 | 4/2014 | Hacker et al. | |
| 9,163,930 B2 | 10/2015 | Buckland et al. | |
| 9,335,154 B2 | 5/2016 | Wax et al. | |
| 2001/0034478 A1 | 10/2001 | Lambert et al. | |
| 2002/0163948 A1 | 11/2002 | Yoshida et al. | |
| 2004/0036838 A1 | 2/2004 | Podoleanu et al. | |
| 2005/0171438 A1 | 8/2005 | Chen et al. | |
| 2005/0201432 A1 | 9/2005 | Uehara et al. | |
| 2005/0213103 A1 | 9/2005 | Everett et al. | |
| 2006/0105209 A1 | 5/2006 | Thyroff et al. | |
| 2006/0109872 A1 | 5/2006 | Sanders | |
| 2006/0215713 A1 | 9/2006 | Flanders et al. | |
| 2007/0040033 A1 | 2/2007 | Rosenberg | |
| 2007/0076217 A1 | 4/2007 | Baker et al. | |
| 2007/0081166 A1 | 4/2007 | Brown et al. | |
| 2007/0133647 A1 | 6/2007 | Daiber | |
| 2007/0141418 A1 | 6/2007 | Ota et al. | |
| 2007/0233396 A1 | 10/2007 | Tearney et al. | |
| 2007/0263226 A1 | 11/2007 | Kurtz et al. | |
| 2007/0291277 A1 | 12/2007 | Everett et al. | |
| 2008/0097194 A1 | 4/2008 | Milner | |
| 2008/0269575 A1 | 10/2008 | Iddan | |
| 2009/0022181 A1 | 1/2009 | Atkins et al. | |
| 2009/0079993 A1 | 3/2009 | Yatagai et al. | |
| 2009/0103050 A1 | 4/2009 | Michaels et al. | |
| 2009/0169928 A1 | 7/2009 | Nishimura et al. | |
| 2009/0247853 A1 | 10/2009 | Debreczeny | |
| 2009/0268020 A1 | 10/2009 | Buckland et al. | |
| 2009/0290613 A1 | 11/2009 | Zheng et al. | |
| 2010/0110171 A1 | 5/2010 | Satake | |
| 2010/0157308 A1 | 6/2010 | Xie | |
| 2010/0246612 A1 | 9/2010 | Shimizu | |
| 2010/0253908 A1 | 10/2010 | Hammer et al. | |
| 2010/0284021 A1 | 11/2010 | Hacker | |
| 2011/0112385 A1 | 5/2011 | Aalders | |
| 2011/0228218 A1 * | 9/2011 | Hauger | A61B 3/102 |
| | | | 351/205 |
| 2011/0235045 A1 | 9/2011 | Koerner | |
| 2011/0255054 A1 | 10/2011 | Hacker et al. | |
| 2011/0299034 A1 | 12/2011 | Walsh et al. | |
| 2012/0013849 A1 | 1/2012 | Podoleanu et al. | |
| 2012/0026466 A1 | 2/2012 | Zhou et al. | |
| 2012/0133950 A1 | 5/2012 | Suehira et al. | |
| 2012/0136259 A1 | 5/2012 | Milner et al. | |
| 2012/0188555 A1 | 7/2012 | Izatt et al. | |
| 2013/0265545 A1 * | 10/2013 | Buckland | A61B 3/13 |
| | | | 351/206 |
| 2014/0051952 A1 | 2/2014 | Reichgott et al. | |
| 2014/0111774 A1 | 4/2014 | Komine | |
| 2014/0228681 A1 | 8/2014 | Jia et al. | |
| 2014/0268163 A1 | 9/2014 | Milner et al. | |
| 2014/0293290 A1 | 10/2014 | Kulkarni | |
| 2014/0336479 A1 | 11/2014 | Ando | |
| 2015/0223681 A1 | 8/2015 | Kuranov et al. | |
| 2015/0348287 A1 | 12/2015 | Yi et al. | |
| 2016/0178346 A1 | 6/2016 | Kulkarni | |
| 2017/0090031 A1 | 3/2017 | Bondy et al. | |
| 2018/0128594 A1 | 5/2018 | Lee et al. | |

FOREIGN PATENT DOCUMENTS

| | | |
|---|---|---|
| JP | 2008-188047 | 8/2008 |
| JP | 2010-172538 | 8/2010 |
| WO | WO-2012/075126 A2 | 6/2012 |
| WO | WO-2013/168149 A1 | 11/2013 |
| WO | WO-2015/121756 A2 | 8/2015 |

OTHER PUBLICATIONS

Chowdhury, Md Koushik et al., Challenges & Countermeasures in Optical Noninvasive Blood Glucose Detection, International Journal of Innovative Research in Science, Engineering and Technology vol. 2, Issue 1, Jan. 2013 (6 pages).

Dai et al., "Optical coherence tomography for whole eye segment imaging," Optics Express, vol. 20, No. 6 (2012) pp. 6109-6115.

Dhalla et al., "Simultaneous swept source optical coherence tomography of the anterior segment and retina using coherence revival," Optics Letters, vol. 37 No. 11, Jun. 1, 2012, pp. 1883-1885.

English Translation of the International Search Report and Written Opinion on International Application No. PCT/EP2009/009189, dated Apr. 6, 2010, 12 pages.

F. Lexer et al., "Wavelength-tuning interferometry of intraocular distances," Applied Optics, vol. 36, No. 25, pp. 6548-6553 (Sep. 1, 1997).

Fainman, Y. et al., "Nanophotonics for Information Systems," Information Optics and Photonics (T. Fournel and B. Javidi eds., Springer New York, 2010) pp. 13-37.

International Preliminary Report on Patentability in corresponding application PCT/US2016/035012 dated Dec. 14, 2017.

International Preliminary Report on Patentability in corresponding international application No. PCT/US2015/019299 dated Sep. 22, 2016.

International Preliminary Report on Patentability in corresponding international application No. PCT/US2015/032727 dated Dec. 8, 2016.

International Preliminary Report on Patentability in International appln. No. PCT/IB2015/000808.

International Search Report and Written Opinion dated Aug. 26, 2015 for PCT/US15/32727 (8 pages).

International Search Report and Written Opinion in corresponding application No. PCT/US2016/035012 dated Aug. 18, 2016.

International Search Report and Written Opinion in International Application No. PCT/US2015/19299 dated Nov. 2, 2015 (10 pages).

International Search Report and Written Opinion in PCT/IB2015/000808 dated Oct. 20, 2015 (12 pages).

(56) References Cited

OTHER PUBLICATIONS

Jeong et al., "Spectral-domain OCT with dual illumination and interlaced detection for simultaneous anterior segment and retina imaging," Optics Express, vol. 20, Issue 17, pp. 19148-19159 (2012).
Jia et al., Split-Spectrum Amplitude-Decorrelation Angiography with Optical Coherence Tomography, Optics Express, vol. 20 No. 4, Feb. 9, 2012, pp. 4710-4725.
Lexer et al., "Wavelength-tuning interferometry of intraocular distances", Applied Optics, vol. 36, No. 25, Sep. 1, 1997, pp. 6548-6553.
Mariampillai et al., Speckle Variance Detection of Microvasculature Using Swept-Source Optical Coherence Tomography, Optics Letters, vol. 33 No. 13, Jul. 1, 2008, pp. 1530-1532.
Nankivil et al.,"Handheld, rapidly switchable, anterior/posterior segment swept source optical coherence tomography probe," OSA Nov. 1, 2015; vol. 6, No. 11; DOI:10.1364/BOE.6.004516; Biomedical Optics Express 4516-4528.
Non-Final Rejection on U.S. Appl. No. 14/723,325 dated Dec. 7, 2017.
P. Tayebati et al., "Microelectromechanical tunable filter with stable half symmetric cavity," Electronics Letters, vol. 34, No. 20, pp. 1967-1968 (Oct. 1, 1998).
Poddar, et al., "Non-Invasive Glucose Monitoring Techniques: A Review and Current Trends," Oct. 31, 2008, pp. 1-47.
Sarlet, G. et al., "Wavelength and Mode Stabilization of Widely Tunable SG-DBR and SSG-DBR Lasers," IEEE Photonics Technology Letters, vol. 11, No. 11, Nov. 1999, pp. 1351-1353.
Segawa, Toru et al., "Semiconductor Double-Ring-Resonator-Coupled Tunable Laser for Wavelength Routing," IEEE Journal of Quantum Electronics, vol. 45, No. 7, Jul. 2009, pp. 892-899.
Sergie Ortiz, et al. "Corneal Topography From Spectral Optical Coherence Tomography (SOCT)." Biomedical Optics Express 2:12, (2011):3232-3247.
U.S. Notice of Allowance on U.S. Appl. No. 14/601,945 dated Sep. 13, 2016.
U.S. Office Action on 105093-0102 dated Sep. 12, 2013.
U.S. Office Action on 105093-0116 dated Aug. 19, 2015.
U.S. Office Action on U.S. Appl. No. 14/601,945 dated Mar. 2, 2016.
U.S. Office Action on U.S. Appl. No. 14/613,644 dated Jun. 8, 2016.
U.S. Office Action on U.S. Appl. No. 14/641,200 dated Mar. 14, 2016.
U.S. Office Action on U.S. Appl. No. 14/641,200 dated Dec. 7, 2015.
U.S. Office Action on U.S. Appl. No. 14/723,325 dated Nov. 18, 2016.
U.S. Office Action on U.S. Appl. No. 15/202,925 dated Jul. 27, 2017.
Chopra et al., Topographical Thickness of the Skin in the Human Face, Aesthetic Surgery Journal, vol. 35(8), 2015, pp. 1007-1013.
Final Office Action on U.S. Appl. No. 14/723,325 dated Jul. 26, 2018.
Non-Final Office Action on U.S. Appl. No. 15/086,520 dated Aug. 6, 2018.
Non-Final Office Action on U.S. Appl. No. 15/139,579 dated Jul. 17, 2018.
Non-Final Office Action on U.S. Appl. No. 15/648,239 dated Jun. 6, 2018.
U.S. Notice of Allowance on U.S. Appl. No. 15/202,925 dated May 17, 2018.
U.S. Office Action on U.S. Appl. No. 15/630,654 dated Apr. 4, 2018.

\* cited by examiner

SYSTEMS AND METHODS FOR VARIABLE-RANGE FOURIER DOMAIN IMAGING

BACKGROUND

Optical coherence tomography (OCT) is commonly used in medical imaging applications (e.g., ophthalmic imaging) or industrial imaging. Typically, OCT has only been used to image relatively small areas (e.g., with imaging depth and field of view on a millimeter scale). Recent advances in light sources have opened up the possibility of utilizing OCT for applications with larger imaging areas (e.g., greater than one meter). However, long range imaging applications typically require optics having large field of views (FOVs) to facilitate imaging wide angle scenes. Optics configured for large FOVs are generally sub-optimal for close range imaging applications.

SUMMARY

One embodiment relates to an optical system. The optical system includes a light source configured to generate an optical beam and project the optical beam along an optical path. The optical system also includes an interferometer. The interferometer includes a scanner disposed on the optical path, the scanner being configured to direct a sample component of the optical beam along one of a plurality of different directions within a scanning range and a lens system disposed downstream of the scanner configured to project the sample component to an imaging area defined by a field of view of the optical system, the lens system comprising a first lens, wherein an aspect of the first lens is adjustable so as to render the field of view adjustable without adjusting the scanning range of the scanner. The optical system further includes a detector configured to receive a reflected portion of the sample component that reflects from an object placed within the imaging area.

Another embodiment relates to an OCT system. The OCT system includes a light source configured to generate an optical beam. The OCT system also includes an interferometer. The interferometer includes an optical element configured to direct a reference component of the optical beam along a reference arm of the interferometer and a sample component of the optical beam along a sample arm of the interferometer. The sample arm includes a scanner configured to direct the sample component along one of a plurality of different directions within a scanning range and a lens system disposed downstream of the scanner configured to project the sample beam to an imaging area defined by a field of view of the OCT system. The lens system includes a first lens. An aspect of the first lens is adjustable so as to render the field of view adjustable without adjusting the scanning range of the scanner. The optical element is further configured to combine the reference component with a reflected portion of the sample component that reflects off an object placed in the imaging area to produce an interference pattern. The OCT system further includes a detector configured to receive the interference pattern. The OCT system further includes a computing system including a processing circuit, the processing circuit including a processor and a memory, the memory being structured to store instructions that are executable by the processor to cause the processor to receive an image signal from the detector and generate an OCT image based on the image signal.

Another embodiment relates to a method of operating an OCT system. The method includes receiving, by a computing device, an indication of a desired imaging distance. The method also includes, in response to receiving the indication, adjusting, by a computing device, an effective focal length of a lens system disposed downstream of a scanner in a sample arm of an interferometer to simultaneously adjust the field of view and the angular resolution of the OCT system based on the desired imaging distance.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
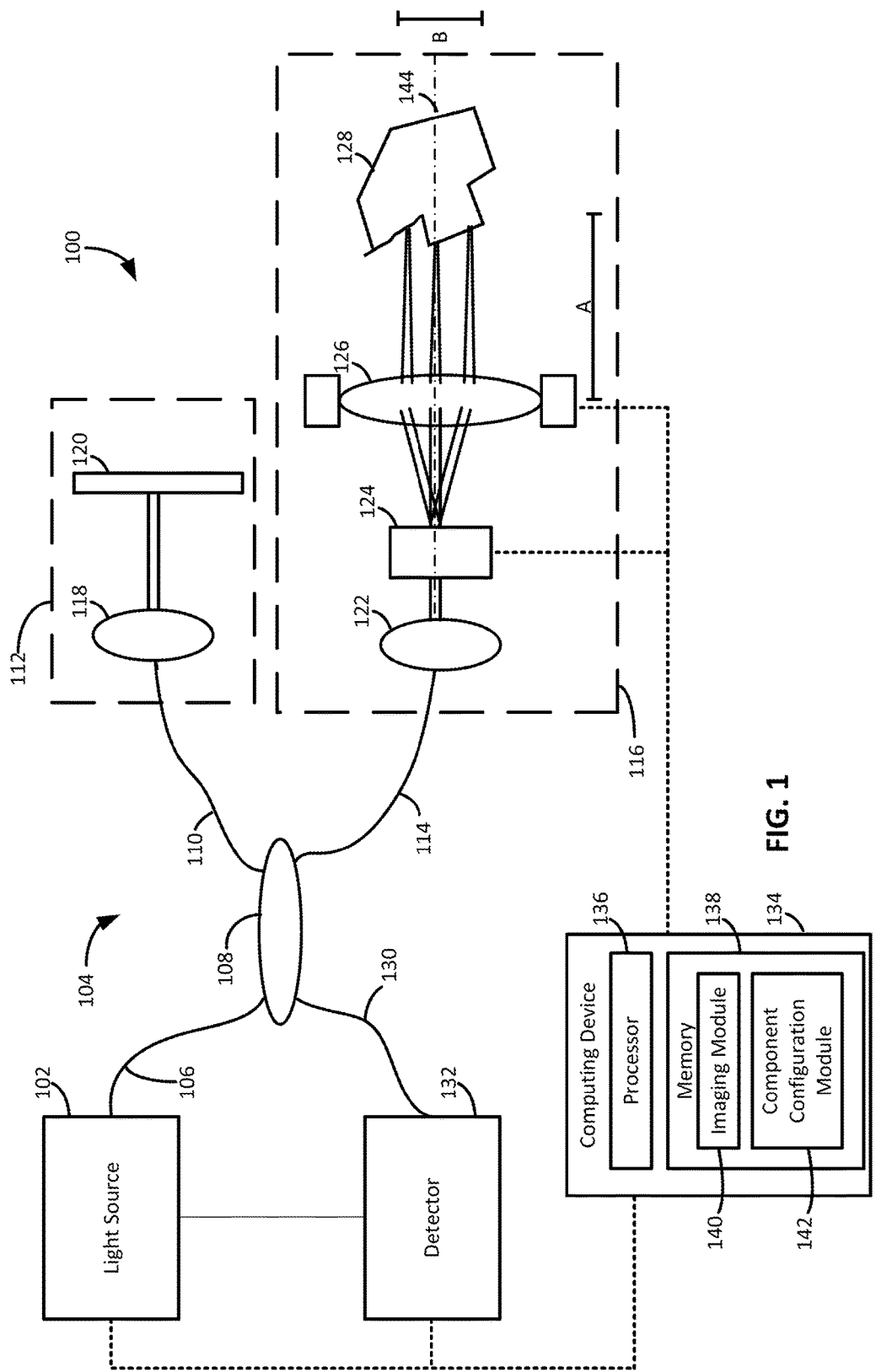
FIG. 1 depicts a representation of an imaging system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein is a Fourier domain imaging system that effectively images samples located at a wide range of distances from the imaging system. The imaging system described herein beneficially combines an adjustable lens system to adjust both the field of view (FOV) and angular resolution of the imaging system simultaneously to accommodate a wide variety of imaging distances.

Typically, Fourier domain imaging systems are designed with a narrow range of imaging distances in mind. Such designs limit the environments in which these systems may be used. If a particular system is designed for a relatively large imaging distance (e.g., greater than 1 meter), for example, then the system may be configured with a relatively large FOV for imaging objects placed at such a distance. Optics configured to produce a wide FOV generally produce an optical beam having a relatively large spot size, thereby reducing angular resolution and limiting the system's efficacy at shorter imaging distances.

The systems and methods disclosed herein cure these deficiencies through strategic incorporation of adjustable optical elements throughout the system. For example, in one embodiment, an imaging system includes an adjustable lens system disposed downstream of a scanning element. The effective focal length of the adjustable lens system may be adjusted to simultaneously adjust the FOV and angular resolution of the imaging system based on a preferred imaging distance. Additionally, in some embodiments, the imaging system includes an adjustable beam expander disposed upstream of the scanning element. Individual components of the adjustable beam expander may be adjusted to expand or contract the optical beam prior to the optical beam's introduction into the lens system, thereby enabling the Rayleigh length of the optical beam to be adjusted to accommodate multiple imaging distances. Thus, the systems and methods disclosed herein beneficially enable one to produce clear images of objects placed at a wide variety of distances from the imaging system.

FIG. 1 depicts an imaging system 100 in accordance with an illustrative embodiment. In the example shown, the imaging system 100 includes a light source 102 and an interferometer 104 (e.g., a Michelson-type interferometer). As described herein, the imaging system 100 may be used to image samples placed at a number of different distances from the imaging system 100.

The light source 102 is configured to emit an optical beam used to image a sample 128 placed a distance A from an adjustable lens system 126. In an embodiment, light source 102 includes a swept laser. For example, the light source 102 may include a swept vertical-cavity surface-emitting laser (VCSEL). The VSCEL may be either optically pumped or electrically pumped and, in some embodiments, includes a suspended Micro-Electromechanical Systems (MEMS)-based mirror. In various embodiments, the distance between the suspended mirror and another reflector may be changed via application of a voltage to the suspended mirror, thereby altering the resonance wavelength of the laser cavity and changing the light output by the light source 102. Beneficially, utilization of such a light source 102 provides a greater coherence length (e.g., above 200 m), enabling imaging at great distances to take place.

In the example shown, the interferometer 104 includes a first optical fiber 106 that receives an optical beam emitted from the light source 102 and guides the optical beam to a fiber optic coupler 108. The fiber optic coupler 108 separates the optical beam into a reference component beam that is guided by a second optical fiber 110 into a reference arm 112 and a sample component beam that is guided by a third optical fiber 114 into a sample arm 116.

The reference arm 112 includes a first lens 118 and a reference mirror 120. In an embodiment, the first lens 118 is a bi-convex lens that collimates the reference component beam upon the optical beam's emission from the second optical fiber 110. Upon collimation, the reference component beam travels a reference path length to the reference mirror 120. In an embodiment, the reference mirror 120 includes a substantially planar mirror configured to redirect the reference component beam back in a direction substantially parallel to the incidental direction of the reference component beam. In some embodiments, the reference mirror 120 is held stationary to perform frequency-domain optical coherence tomography measurements. Upon reflecting off of the reference mirror 120, the first lens 118 re-focuses the reference component beam back into the second optical fiber 110 for transmittal back to the fiber optic coupler 108.

The sample arm 116 includes a second lens 122, a scanner 124, an adjustable lens system 126, and a sample 128. In some embodiments, the second lens 122, the scanner 124, and the adjustable lens system 126 all share a common optical axis 144, although any one or combination of the previously mentioned components may have an offset optical axis without departing from the scope of the present disclosure. In an embodiment, the second lens 122 includes a positive bi-convex lens configured to collimate the sample component beam upon the sample component beam's emission from the third optical fiber 114. In some embodiments, the scanner 124 is galvanometric scanner including at least one mirror. In an embodiment, the galvanometric scanner includes a rotary motor configured to rotate based on control signals received from a computing device 134, thereby varying the propagation direction of the sample component beam. As such, after being reflected by the mirrors of the scanner 124, the optical beam may propagate at an angle to the optical axis 144. It should be understood that the scanner 124 may be a refractive device (e.g., a pair of wedge prisms) or any other type of scanner without departing from the scope of the present disclosure.

In various embodiments, the scanner 124 is configured to direct the sample component beam down one of a number potential different beam paths within a predefined angular range (e.g., defined by the rotational limits of the rotary motor). For example, starting from a first limit of the angular range, scanner 124 may angularly rotate in a first angular direction in angular intervals so as to project the sample component beam to various locations within an imaging area of the imaging system 100.

The adjustable lens system 126 is configured to project the sample component beam to a sample 128 within an imaging area of the imaging system 100 upon the sample component beam being directed in a particular direction by the scanner 124. The sample component beam is transmitted (e.g., refracts) through the adjustable lens system 126 and is thereby redirected to a particular position in the imaging area. In some embodiments, the adjustable lens system 126 includes an electrically tunable lens. For example, in an embodiment, the electrically tunable lens includes a container housing an optical fluid. An electromagnetic actuator exerts varying amounts of mechanical pressure (e.g., based on a control signal received from the computing device 134) to the container to adjust the radius of curvature of the electrically tunable lens. In alternative embodiments, the adjustable lens system 126 includes different types of electrically tunable lenses, such as liquid lenses, or a liquid crystal based lens.

While FIG. 1 shows the adjustable lens system 126 as including a single optical component, it should be understood that the adjustable lens system 126 may include multiple optical components without departing from the scope of the present disclosure. For example, in some embodiments, the adjustable lens system 126 includes a zoom lens system including a number of different lenses. For example, the number of different lenses may include an afocal zoom system including two positive lenses with a negative lens disposed between the positive lenses. The two positive lenses may move relative to one another to change the overall magnification of the system. As will be appreciated, the position to which the sample component beam is directed as well as additional characteristics of the sample component beam (e.g., distortion, spot size, etc.) are dependent on the relative positioning of the scanner 124 and the adjustable lens system 126.

In the example shown in FIG. 1, the adjustable lens system 126 is configured such that the center of the scanner 124 lies in a focal plane of the adjustable lens system 126. Such a configuration enables telecentric scanning of the sample 128. However, based on control signals received from the computing device 134, the positioning of the focal plane of the adjustable lens system 126 may vary with respect to the scanner 124 so as to simultaneously adjust the FOV and angular resolution with which the imaging system 100 is capable of scanning the sample 128.

As shown in FIG. 1, the adjustable lens system 126 is configured to image a sample 128 that is a distance A from the adjustable lens system 126. As shown, the distance A corresponds to a focal position of the adjustable lens system 126, such that the beam size (e.g., beam diameter) of the sample component beam will reach a minimum upon reaching a portion of the sample 128. The focal length of the adjustable lens system 126 may be selected such that the minimal size of the sample component beam is of a size that is comparable to the features of the sample 128 that are to be imaged. Additionally, since the scanner 124 is also placed at a focal plane of the adjustable lens system 126, the sample component beam emerges from the adjustable lens system 126 travelling in a direction that is substantially parallel to the optical axis 144. The imaging system 100 thus has a FOV B that is dependent on the scanning range of the scanner 124 and the distance between the scanner 124 and the adjustable lens system 126.

In various embodiments, the distance A corresponds to a minimal imaging distance of the imaging system 100. For example, the distance A may correspond to the minimum effective focal length of the adjustable lens system 126. As such, the relative distance between the scanner 124 and the adjustable lens system 126 may be selected based on a sample type (e.g., biological tissue) having features of dimensions that are comparable to the minimal spot size of the sample component beam and having a total size not greater than that defined by the FOV B.

Once the sample component beam reaches the sample 128, a portion of the sample component beam scatters off of the sample 128 in a direction substantially parallel to the optical axis 144, through the adjustable lens system 126, scanner 124, and second lens 122, and back into the third optical fiber 114, which is configured to guide the scattered portion back to the fiber optic coupler 108. Thus, the reference component beam and the scattered portion of the sample component beam are combined at the fiber optic coupler 108 to form a combined beam. In various embodiments, the phase of the sample component beam differs from the phase of the reference component beam due the optical path difference of the component beams (e.g., the combined length of the second optical fiber 110 and the reference arm 112 may differ from the combined length of the third optical fiber 114 and the sample arm 116). Based on the phase difference, the reference component beam and the sample component beam may constructively or destructively interfere with one another to produce the interference pattern. The fiber optic coupler 108 directs at least a portion of the combined beam down a fourth optical fiber 130 to a detector 132, which receives the interference pattern and may use the interference pattern in combination with a number of other interference patterns (e.g., produced by different configurations of the scanner 124) to generate an OCT image of the sample 128. In some embodiments, where, for example the light source 102 is a swept laser, the detector 132 may include a photodiode detector configured to generate a plurality of time-varying electrical signals based on the interference pattern.

The computing device 134 is configured to operate various components of the imaging system 100 to generate images of the sample 128 based on the interference patterns generated via the interferometer 104. In this regard, the computing device 134 is communicably coupled to at least the light source 102, the detector 132, the scanner 124, and the adjustable lens system 126. It should be understood that the computing device 134 may be communicably coupled to any component of the imaging system 100 without departing from the scope of the present disclosure. Additionally, it should be understood that the light source 102, scanner 124, and any other optical component of the imaging system 100 may include an independent controller without departing from the scope of the present disclosure.

The computing device 134 includes a processor 136 and a memory 138. Processor 136 may be a general purpose or specific purpose processor, an application specific integrated circuit (ASIC), one or more field programmable gate arrays (FPGAs), a group of processing components, or other suitable processing components. Processor 136 may be configured to execute computer code or instructions stored in memory 138 or received from other computer readable media (e.g., CDROM, network storage, a remote server, etc.) to perform one or more of the processes described herein. Memory 138 may include one or more data storage devices (e.g., memory units, memory devices, computer-readable storage media, etc.) configured to store data, computer code, executable instructions, or other forms of computer-readable information. Memory 138 may include random access memory (RAM), read-only memory (ROM), hard drive storage, temporary storage, non-volatile memory, flash memory, optical memory, or any other suitable memory for storing software objects and/or computer instructions. In some embodiments, the computing device 134 also includes a user interface (not shown). The user interface may include a display or other element (e.g., a button, joystick, etc.) capable of receiving an operator input to adjust any of the operational parameters of any of the components of the imaging system 100.

As shown in FIG. 1, the memory 138 includes an imaging module 140 and a component configuration module 142. It should be understood that the memory 138 may include more, less, or different modules without departing from the scope of the present disclosure. The component configuration module 142 is structured to cause the processor 136 to generate and provide control signals to optical components of the imaging system 100. For example, in some embodiments, via the component configuration module 142, the computing device 134 provides control signals to the light source 102 and scanner 124 to cause a sample component beam to be directed to various positions within the FOV B to generate an image of the sample 128.

In some embodiments, the light source 102 is a swept light source configured to produce a narrow bandwidth output that cycles through a spectral range within a predetermined period. In such embodiments, the control signals provided by the computing device 134 may cause the scanner 124 to remain at a particular angle for a predetermined number of such time periods to enable a plurality of scans (e.g., A scans via scanning the light source 102 through multiple cycles) to be performed. After the light source 102 is scanned a predetermined number of times, the scanner 124 may be adjusted by a predetermined angular amount, and the cycles of the light source 102 may be repeated. As such, various portions of the sample 128 are imaged throughout the entire spectral range of the light source 102, enabling the depth of various surfaces or other features in the sample 128 to be determined at various spatial positions in the sample 128.

Additionally, as described below with respect to FIGS. 2A-2B, via the component configuration module 142, the computing device 134 may also provide control signals to the adjustable lens system 126 to modify (e.g., increase) the imaging distance from the distance A and modify (e.g., increase) the FOV from the FOV B. In some embodiments, such control signals are provided to the adjustable lens system 126 in response to certain inputs.

For example, in one embodiment, a user may indicate a desired imaging distance via the user interface of the computing device 134. Based on the desired imaging distance, the computing device 134 may increase or decrease the effective focal length of the adjustable lens system 126 based on the current configuration of the adjustable lens system 126. If, for example, the desired imaging distance is greater than the current effective focal length of the adjustable lens system 126, the control signal may increase the focal length of the adjustable lens system 126 so as to increase the FOV. In this regard, the component configuration module 142 may include a lookup table that maps focal lengths of the adjustable lens system 126 to various imaging distances. The values populating such a lookup table may be determined experimentally. Alternatively or additionally, the user may manually increase or decrease the effective focal length of the adjustable lens system 126 until the interference signal measured by the detector 132 has a desired characteristic.

In some embodiments, the computing device 134 provides control signals to the adjustable lens system 126 so as to change the effective focal length in response to a detected distance between the sample 128 and the adjustable lens system 126. For example, a portion of the optical beam emanating from the light source 102 may be directed to the detector 132 (e.g., at the beginning of each spectral scan of the light source 102), and the computing device 134 may record the timing of this signal. In some embodiments, this timing is then compared with a time of arrival of a portion of the sample component beam that scatters off of the sample 128. In an embodiment, the reference arm 112 includes an optical chopper that periodically blocks the reference component beam to enable such measurements to be periodically taken. As such, by comparing the arrival times of these signals, the relative distance of the sample 128 may be determined. Based on this determined relative distance, the computing device 134 may provide control signals to the adjustable lens system 126 so as provide the imaging system 100 with a desired imaging distance and FOV.

The imaging module 140 is structured to cause the processor 136 generate an OCT image of the sample 128 using the image data produced by the detector 132. For example, for each respective position of the scanner 124, the imaging module 140 may cause the processor 136 to sample the image signal produced by the detector 132 and produce a scan line with the sampled signal via the Fast Fourier Transform algorithm. After such a process is repeated for various positions of the scanner 124, the imaging module 140 may combine the scan lines to produce a two or three dimensional or three dimensional OCT image of the sample 128. As will be appreciated, the imaging module 140 may cause the processor 136 to perform a number of additional operations (e.g., application of an image enhancement filter, dispersion compensation) on the image data to further enhance the quality of the OCT image. Any image processing techniques may be used in accordance with the present disclosure.

Figure 2A:
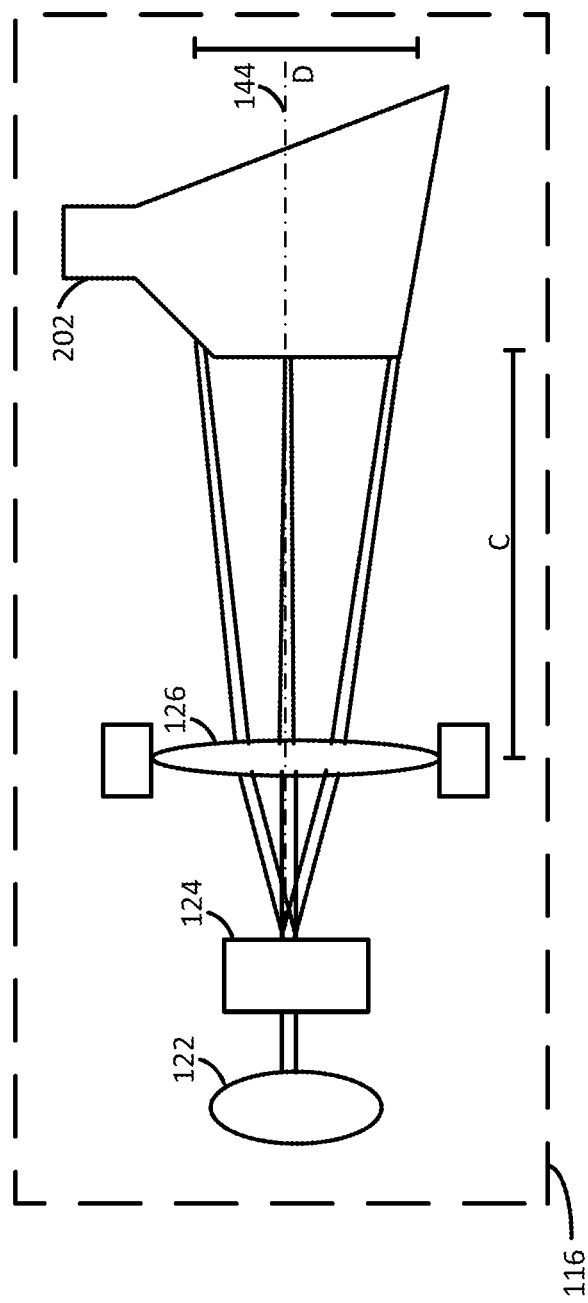
FIGS. 2A-2B depict configurations of a sample arm of an interferometer in accordance with an illustrative embodiment.

Referring now to FIG. 2A, an alternative configuration of the sample arm 116 of the imaging system 100 is shown in accordance with an illustrative embodiment. In the example shown, the effective radius of curvature of the adjustable lens system 126 has been reduced so as to increase the effective focal length of the adjustable lens system 126. Given this, the scanner 124 no longer lies in a focal plane of the adjustable lens system 126, which means that the sample component beam is not directed parallel to the optical axis 144 when the scanner 124 directs the sample component beam at an angle. As such, upon transmittal of the sample component beam through the adjustable lens system 126, the sample component beam may emerge propagating in at an angle to the optical axis 144, and thus the FOV D of the imaging system 100 is greater than the FOV B described with respect to FIG. 1.

Additionally, since the focal length of the adjustable lens system 126 is increased, the sample component beam reaches a minimal spot size at a distance C from the adjustable lens system 126 that is greater than the distance A discussed with respect to FIG. 1. Also due to the greater focal length of the adjustable lens system 126, the magnitude of this minimal spot size is greater than that provided by the configuration of the imaging system 100 described with respect to FIG. 1. As such, the configuration of the sample arm 116 shown in FIG. 2A is suitable for imaging a sample 202 that is larger (or has larger features desired to be imaged) than the sample 128 described with respect to FIG. 1.

Accordingly, the computing device 134 may adjust the adjustable lens system 126 to the configuration shown in FIG. 2A in response to receiving an input that the sample 202 is placed within a distance threshold from the distance C. Making such an adjustment increases the FOV of the imaging system 100 to the FOV D to enable a greater portion of the larger sample 202 to be imaged. While such an adjustment decreases the angular resolution of the imaging system 100, this may not degrade the quality of the image of the sample 202 if the sample 202 has larger features that the user wishes to image. Thus, the imaging system 100 enables one to capture OCT images of objects of varying size and varying distances with the adjustment of only a single component (the adjustable lens system 126).

Figure 2B:
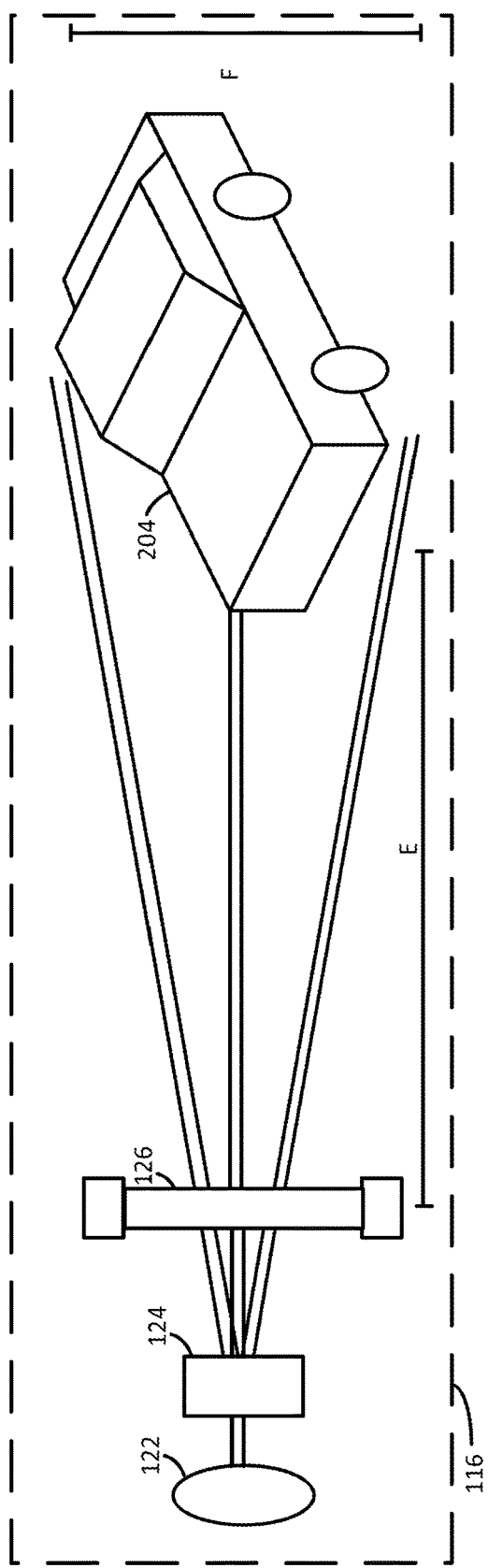

Referring now to FIG. 2B, another configuration of the sample arm 116 is shown in accordance with an illustrative embodiment. In the example shown, the radius of curvature of adjustable lens system 126 has been further increased, such that the adjustable lens system has a relatively large (e.g., approximately infinite) focal length. In such a configuration, the adjustable lens system 126 has zero optical power, and thus does not redirect or focus the sample component beam. As such, the FOV of the imaging system expands to a FOV F, which is greater than the FOV D described with respect to FIG. 2A. Given this, in the configuration shown in FIG. 2B the imaging system 100 is suited to image a sample 204 that is larger than either of the samples 128 and 202 described with respect to FIGS. 1 and 2A. While the lack of focusing of the sample component beam results in a further diminished angular resolution of the imaging system 100, the greater FOV and spot size facilitates the imaging system 100 capturing images of larger samples at still greater distances.

As will be appreciated, while only three different configurations of the sample arm 116 have been described with respect to FIGS. 1, 2A, and 2B, the sample arm 116 can include any number of configurations depending on the sensitivity of the adjustable lens system 126. As such, the imaging system 100 enables images to be taken of a wide variety of objects placed at different distances from the adjustable lens system 126. Thus, users avoid having to use multiple imaging systems for different imaging applications. Through the adjustment of a single optical component (the adjustable lens system 126), users may switch between imaging relatively small objects placed near the adjustable lens system 126 and imaging relatively large objects placed distant from the adjustable lens system 126.

Figure 3:
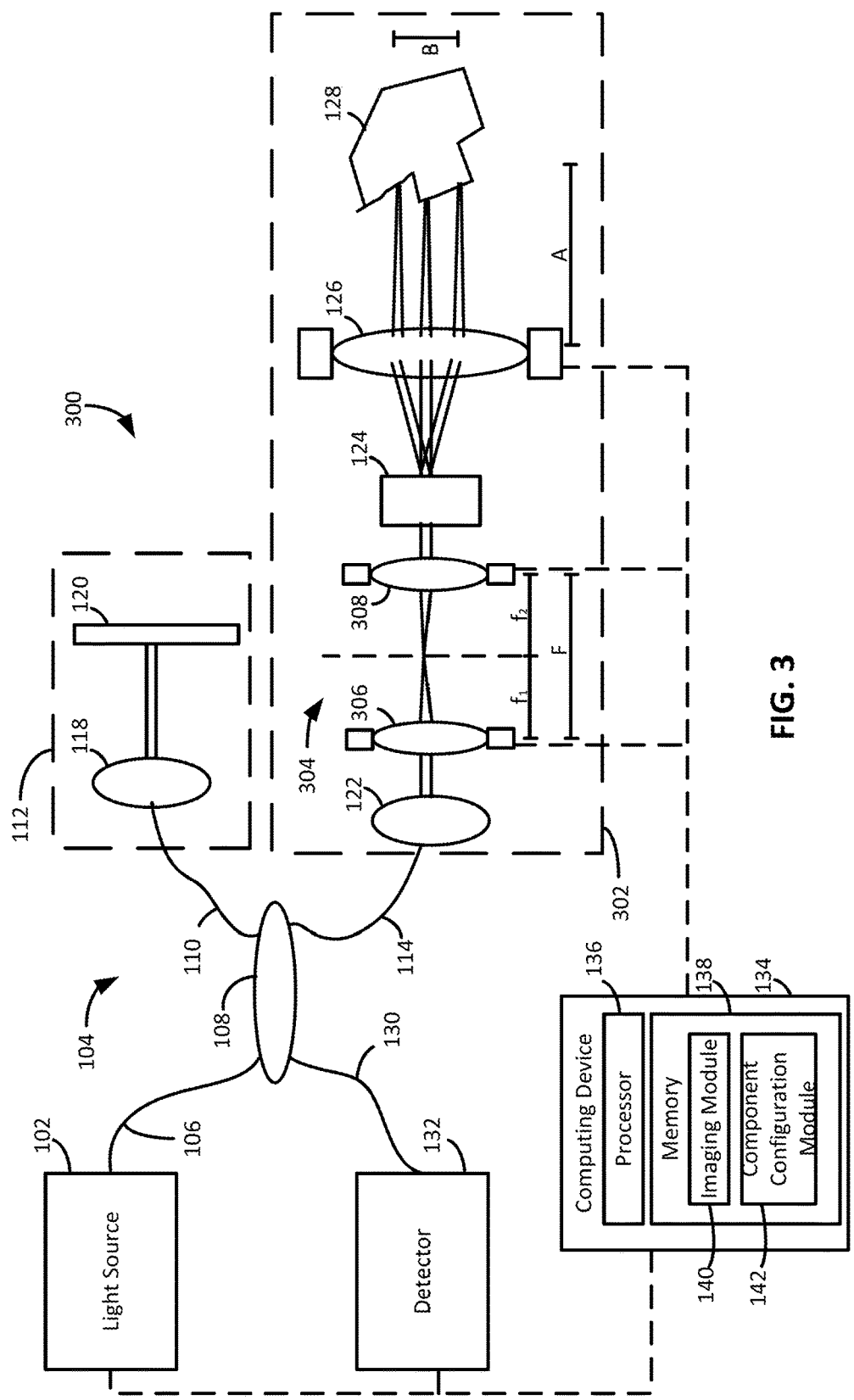
FIG. 3 depicts a representation of an imaging system in accordance with an illustrative embodiment.

Referring now to FIG. 3, a schematic view of an imaging system 300 is shown in accordance with an illustrative embodiment. The imaging system 300 shares multiple features to the imaging system 100 described above with respect to FIG. 3. Accordingly, like reference numerals are used in FIG. 3 to indicate such similar features.

The imaging system 300 differs from the imaging system 100 described with respect to FIG. 1 in that the imaging system 300 includes a different sample arm 302. Specifically, in addition to including the second lens 122, the scanner 124, and the adjustable lens system 126 described with respect to FIG. 1, the sample arm 302 also includes an adjustable beam expander 304 disposed between the second lens 122 and the scanner 124. The adjustable beam expender 304 is configured to re-size the sample component beam prior to the sample component beam reaching the adjustable lens system 126. Such adjustability further adds to the flexibility of the imaging system 300. Assuming that the sample component beam possesses a Gaussian beam profile, the minimal spot size $w_0$ of the sample component beam at the focal length FL of the adjustable lens system 126 is calculated as:

$$2w_o = \left(\frac{4\lambda}{\pi}\right)\left(\frac{FL}{D}\right). \quad (1)$$

Where $\lambda$ is the wavelength of the spectral component beam, FL is the effective focal length of the adjustable lens system 126, and D is the size (e.g., diameter) of the sample component beam prior to reaching the adjustable lens system 126. Thus, the adjustable beam expander 304, by facilitating the adjustment of D, enables users to adjust the minimal spot size of the sample component beam at a specific distance. Such adjustments facilitate fine tuning the angular resolution of the imaging system 300, further enhancing the flexibility of the imaging system 300.

Additionally, adjustment of the beam size D (e.g., diameter, spot size at a predetermined distance, etc.) also facilitates the adjustment of additional factors of the imaging system 300. For example, the beam divergence and Rayleigh length of adjustable lens system 126 may be expressed as:

$$\theta = \frac{4\lambda}{2\pi * w_o}; \text{ and} \quad (2)$$

$$Z_R = \frac{\pi w_o^2}{\lambda}. \quad (3)$$

Where $\Theta$ is the beam divergence and $Z_R$ is the Rayleigh length. As such, the tuning of D via the adjustable beam expander 304 enables real-time tuning of a number of factors impacting the imaging range of the imaging system 300. Thus, the computing device 134 may respond to the user's demands in real time to optimize the FOV and angular resolution of imaging system 300.

In the example shown, the adjustable beam expander 304 includes a first adjustable lens component 306 and a second adjustable lens component 308. The first and second adjustable lens components 306 and 308 are separated from one another by a distance F. In various embodiments, the first and second adjustable lens components 306 and 308 comprise tunable lenses with focal lengths adjustable within a predetermined range. In one embodiment, the first adjustable lens component 306 is identical to the second adjustable lens component 308.

The first adjustable lens component 306 has a tunable focal length $f_1$ and the second adjustable lens component 308 has a tunable focal length $f_2$. In an embodiment, the computing device 134 is configured to adjust $f_1$ and $f_2$ to adjust the size of the sample component beam in response to a desired imaging mode of the imaging system 300.

In the configuration shown in FIG. 3, $f_1$ and $f_2$ are equal to one another (e.g., each of $f_1$ and $f_2$ are half the value of F). As such, the adjustable beam expander 304 maintains the size of the sample component beam. In some embodiments, the configuration shown in FIG. 3 represents a minimal sample component beam size. In such embodiments, the computing device 134 adjusts the focal length $f_1$ of the first adjustable lens component 306 downward from half the value of F and adjusts the focal length $f_2$ upward from half the value of F to increase the size of the sample component beam from the size shown in FIG. 3. Alternatively, $f_1$ may be increased from half the value of F and $f_2$ may be decreased to downsize the sample component beam.

In some embodiments, $f_1$ and $f_2$ are adjusted such that the sum of $f_1$ and $f_2$ always equals F. In such embodiments, the size D of the sample component beam may be expressed as:

$$D = \left(\frac{f_2}{f_1}\right) * D_o \quad (4)$$

where $D_0$ represents the size of the sample component beam upon emergence from the second lens 122. Thus, the ratio of the $f_2$ and $f_1$ may be termed the "expansion radio" of the adjustable beam expander 304. Accordingly, depending on the current circumstances of the imaging system 300, the computing device 134 (e.g., via the component configuration module 142) may adjust $f_1$ downward and adjust $f_2$ upward by a corresponding amount to change the size of the sample component beam.

In some embodiments, the extent of the adjustments made via the adjustable beam expander 304 is dependent on the current state of the adjustable lens system 126. For example, as shown in FIG. 3, the adjustable lens system 126 is in a state where the focal length corresponds to the distance A between the sample 128 and the adjustable lens system 126. While the adjustable lens system 126 is in such a state, the extent to which $f_1$ and $f_2$ are adjusted may be relatively limited to keep the minimal spot size $w_0$ within a desired range.

Figure 4A:
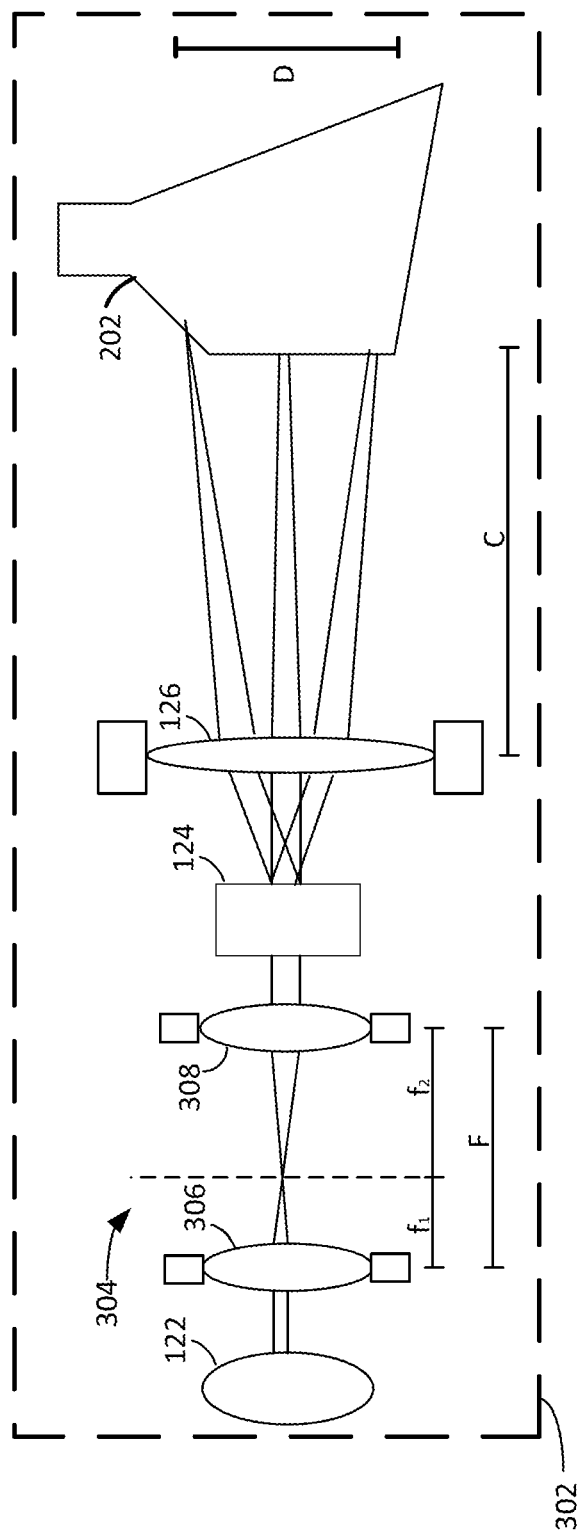
FIGS. 4A-4B depict configurations of a sample arm of an interferometer in accordance with an illustrative embodiment.

Referring now to FIG. 4A, an alternative configuration of the sample arm 302 is shown according to an illustrative embodiment. In the configuration shown, the focal length of the adjustable lens system 126 has been adjusted to be longer than shown in FIG. 3. As shown, the focal length of the adjustable lens system 126 corresponds with a distance C between the adjustable lens system and a sample 202. Given the longer focal length of the adjustable lens system 126, the imaging system 300 possesses a larger FOV D than the FOV B shown in FIG. 3. As such, if the sample 202 is larger than the sample 128 discussed with respect to FIG. 3, the configuration shown in FIG. 4A enables a larger portion of the sample 202 to be imaged.

If the size of the sample component beam were kept equivalent to that shown in FIG. 3, the minimal spot size $w_0$ at the distance C would be larger in accordance with equation 2. As such, the angular resolution of the imaging system 300 would be effectively reduced. As shown in FIG. 4A, however, the adjustable beam expander 304 has been adjusted such that $f_1$ has been adjusted downward by an amount and $f_2$ has been adjusted upward by a corresponding amount, resulting in an expansion in the size of the sample component beam prior to its incidence on adjustable lens system 126. Given, this, the minimal spot size $w_0$ at the distance C is thus reduced, increasing angular resolution of the imaging system 300. Thus, via the incorporation of the adjustable beam expander 304, one may effectively increase the FOV of the imaging system 300 while maintaining the angular resolution.

Figure 4B:
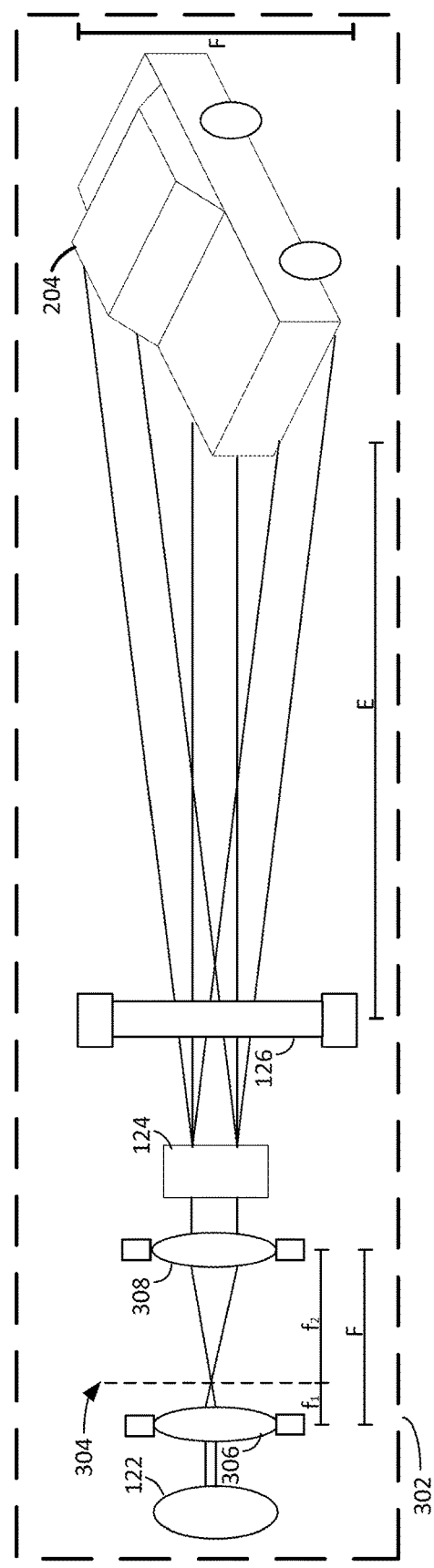

Referring now to FIG. 4B, another alternative configuration of the sample arm 302 in accordance with an illustrative embodiment. The focal length of the adjustable lens system 126 has been adjusted from the configuration shown in FIG. 4A such that the adjustable lens system 126 has little-to-no optical power. As such, the sample component beam maintains size after refraction through the adjustable lens system 126. In various embodiments, the configuration shown in FIG. 4B is designed for imaging a large sample 204 at a distance E that is larger than either the distances A or C described herein. Due to the lengthening of the focal length of the adjustable lens system 126, the imaging system 300 is provided with a FOV F that is larger than the FOV D described with respect to FIG. 4A to accommodate a larger sample 204.

In the event that the adjustable beam expander 304 were left in the state shown in FIG. 4A, the Rayleigh length of the imaging system 300 would be effectively reduced. Thus, if the distance E is above the Rayleigh length, the quality of images produced by imaging system 300 would be reduced due to divergence of the sample component beam. Accordingly, the adjustable beam expander is adjusted such that $f_1$ has been adjusted downward by an amount and $f_2$ has been adjusted upward by a corresponding amount, resulting in an expansion in the size of the sample component beam prior to its incidence on adjustable lens system 126. Given this, the Rayleigh range of the sample component beam is effectively increased, facilitating the imaging of samples placed at the relatively large distance E.

Figure 5:
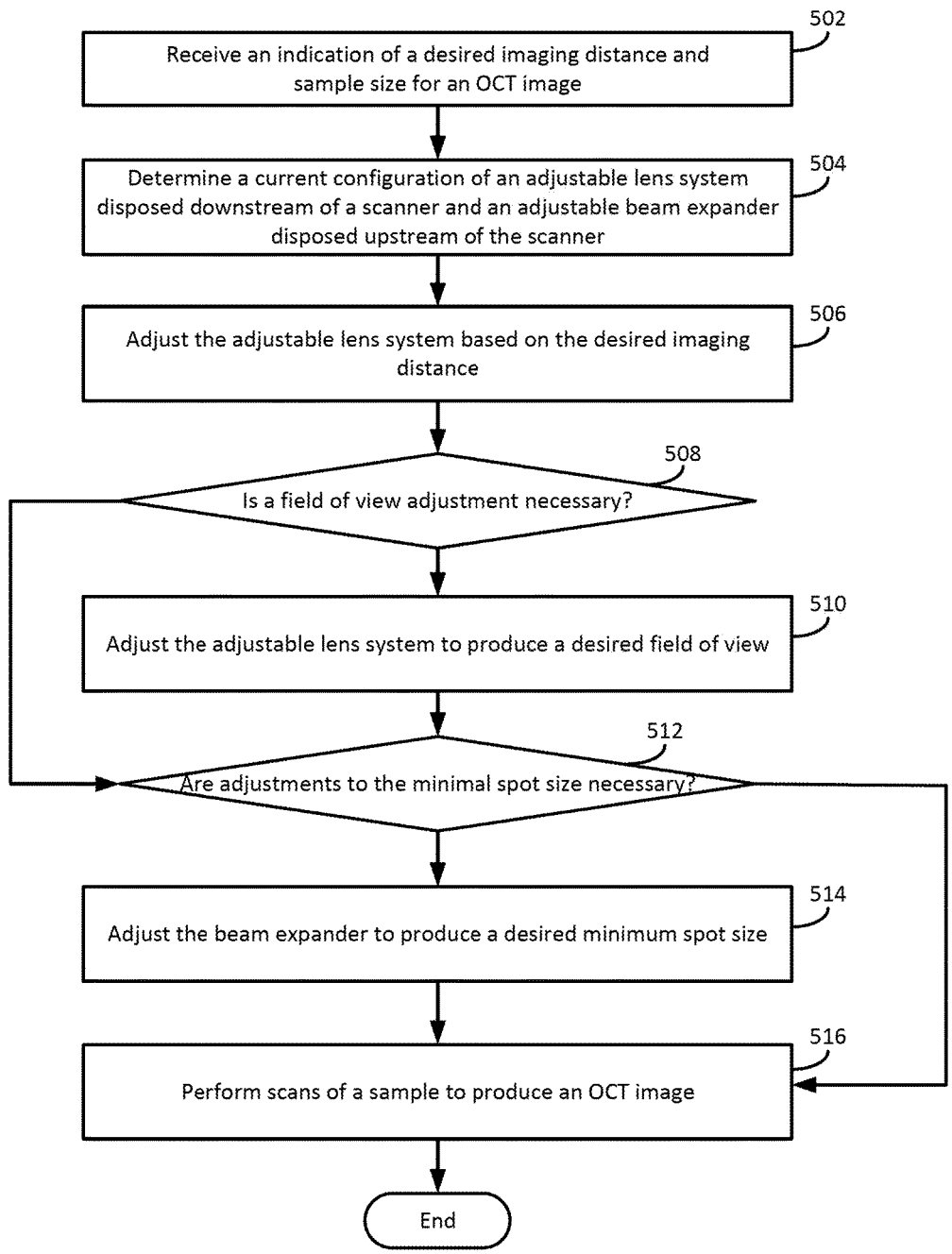
FIG. 5 depicts a method of adjusting an OCT system based on a desired imaging distance in accordance with an illustrative embodiment.

FIG. 5 illustrates a method 500 of operating an OCT system in accordance with an illustrative embodiment. Method 500 may, for example, be executed by the computing device 134 of the imaging system 300 described with respect to FIG. 3. In an operation 502, an indication of a desired imaging distance and sample size for an OCT image are received. In some embodiments, such indications are received via an input device of the computing device 134. For example, a user may input an approximate imaging distance and/or a sample size. Alternatively or additionally, one or more of such indications may be received automatically. For example, the computing device 134 may measure the delay between a portion of a sample component beam (e.g., generated via the fiber optic coupler 108 of the imaging system 300) that scatters off of a sample and a portion of an optical beam coming directly from a light source (e.g., the light source 102) and determine a desired imaging distance based on the delay. Additionally, the desired sample size may be determined by scanning the sample component beam over a range of angles and identifying a range of angles that produce a scattered sample component beam.

In an operation 504, a current configuration of an adjustable lens system (e.g., the adjustable lens system 126) disposed downstream of a scanner (e.g., the scanner 124) and an adjustable beam expander (e.g., the adjustable beam expander 304) disposed upstream of the scanner are determined. For example, the computing device may monitor the current state (e.g., supplied electrical current amounts) of various elements of the adjustment lens system and beam expender to determine the current effective focal lengths or expansion ratios being produced thereby.

In an operation 506, the adjustable lens system is adjusted based on the desired imaging distance. In various embodiments, the effective focal length of the adjustable lens system is compared to the desired imaging distance. If the desired imaging distance differs from the effective focal length by more than a threshold, the computing device may supply control signals to the adjustable lens system to increase or decrease the effective focal length of the adjustable lens system. In an embodiment, the extent of the adjustments made to the effective focal length depends on the desired imaging distance. For example, if the desired imaging distance is above a certain threshold distance, the computing device may maximize the focal length of the adjustable lens system so as to maximize the Rayleigh system of the OCT system. In other situations, the computing device may adjust the effective focal length of the adjustable lens system to correspond to the desired imaging distance to maximize the angular resolution of the imaging system as a default.

In an operation 508, it is determined whether a field of view adjustment is necessary. For example, once the focal length of the adjustable lens system is initially adjusted based on the desired imaging distance, the computing device may calculate the FOV of the imaging system based on the focal length and an angular range of the scanner. The FOV may then be compared to the desired sample size and further adjustments may be made if necessary. In an operation 510, the adjustable lens system is adjusted to produce a desired FOV. For example, if a larger FOV is needed, the focal length of the adjustable lens system may be increased to have a minimum FOV necessary to image the entire sample size. In some embodiments, if the current FOV is greater than what is necessary, the current state of the adjustable lens system is maintained. In alternative embodiments, if the imaging system has a greater FOV than necessary, the focal length of the adjustable lens system is adjusted downward to produce the minimum FOV needed. Such a configuration enables a minimal spot size to be achieved with limited adjustments to the beam size via the adjustable beam expander.

In an operation 512, it is determined whether adjustments to the minimal spot size of the sample component beam are necessary. For example, the quality of an OCT image being produced by the OCT system may indicate a need for greater angular resolution or a greater Rayleigh range. In this regard, the computing device may include an image processing module configured to identify indications of needs for greater angular resolution (e.g., blurred feature edges). Alternatively or additionally, the user may view OCT images being produced by the imaging system and manually provide such an indication. In an operation 514, adjustments are made to the beam expander to produce a sample component beam having a desired spot size. For example, if a smaller spot size is needed, the expansion ratio of the adjustable beam expander may be reduced by a predetermined amount prior to the operation 512 repeated.

In an operation 516, upon determining that the sample component beam is of a desired size upon incidence on the sample, scans are performed of the sample to produce an OCT image. For example, a light source may produce an optical beam that is divided into a sample component beam and a reference component beam. The computing device may scan the sample and reference component beams across a wavelength spectrum while the sample component beam is directed to multiple positions via the scanner prior to being recombined with the reference component beam to produce various interference signals. Using such interference signals, the computing system may generate an OCT image for presentation for the user. As such, via the method 500, a user may capture OCT images of objects of various sizes placed at a wide variety of distances from the imaging system. In some embodiments, rather than generating an OCT image, a set of depth information is captured. The set of depth information may indicate the distance traveled by the sample component beam at various points in time to provide, for example, a three-dimensional depth profile of the sample. The depth information may have a smaller resolution than that used to generate an OCT image.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Additional embodiments may be set forth in the following claims.

What is claimed is:

1. An optical system comprising:
   a light source configured to generate an optical beam and project the optical beam along an optical path;
   an interferometer comprising:
      a scanner disposed on the optical path, the scanner being configured to direct a sample component of the optical beam along one of a plurality of different directions within a scanning range; and
      a lens system disposed downstream of the scanner, the lens system configured to project the sample component to an imaging area defined by a field of view of the optical system, the lens system comprising a first lens, wherein an aspect of the first lens is adjustable so as to render the field of view adjustable without adjusting the scanning range of the scanner; and
   a detector configured to receive a reflected portion of the sample component that reflects from an object placed within the imaging area.

2. The optical system of claim 1, wherein the scanner and the lens system form a sample arm of the interferometer, wherein the interferometer further includes an optical element upstream of the scanner, and wherein the optical element is configured to:
   split the optical beam into the sample component and a reference component,
   direct the reference component along a reference arm of the interferometer,
   direct the sample component to the sample arm, and
   guide the reflected portion and the reference component to the detector to generate an interference signal.

3. The optical system of claim 1, wherein the sample arm further includes a beam expander configured to expand the sample component to a desired size prior to the sample component reaching the lens system.

4. The optical system of claim 3, wherein the beam expander includes a first tunable lens, a second tunable lens, and a controller configured to adjust the focal lengths of the first and second lenses.

5. The optical system of claim 4, wherein the controller is configured to:
receive an indication that a desired imaging distance of the OCT system is below a first threshold value; and
in response to receiving the indication that the desired imaging distance is below the first threshold value, provide control signals to the first and second tunable lenses such that focal lengths of the first and second tunable lenses both equal a value, wherein the value equals one half of a distance separating the first and second tunable lenses.

6. The optical system of claim 5, wherein the controller is configured to:
receive an indication that a desired imaging distance is above a second threshold value; and
in response to receiving the indication that the desired imaging distance is above the second threshold value, provide control signals to the first and second tunable lenses such that the focal length of the first tunable lens decreases from the value by an amount and the focal length of the second tunable lens increases from the value by the amount so as to increase the size of the sample component beam.

7. The optical system of claim 1, wherein the lens system includes a camera zoom lens including an additional lens to the first lens, and wherein the adjustable aspect of the first lens includes a relative distance between the first lens and the additional lens.

8. The optical system of claim 1, wherein the first lens comprises a tunable lens having an electrically adjustable radius of curvature.

9. The optical system of claim 1, wherein the light source includes a tunable vertical cavity surface emitting laser.

10. The OCT system of claim 1, wherein the lens system includes at least one of a camera zoom lens and a tunable lens having an electrically variable radius of curvature, wherein the instructions further cause the processing circuit to provide control signals to the lens system to adjust an effective focal length of the lens system so as to change the field of view of the OCT system.

11. The OCT system of claim 10, wherein the instructions cause the processor to:
receive an indication that the OCT system requires an increased field of view; and
in response to receiving the indication that the OCT system requires the increased field of view, provide control signals to the lens system to increase the focal length of the lens system based on the increased field of view.

12. An OCT system comprising:
a light source configured to generate an optical beam;
an interferometer comprising:
an optical element configured to direct a reference component of the optical beam along a reference arm of the interferometer and a sample component of the optical beam along a sample arm of the interferometer, wherein the sample arm comprises:
a scanner configured to direct the sample component along one of a plurality of different directions within a scanning range; and
a lens system disposed downstream of the scanner configured to project the sample beam to an imaging area defined by a field of view of the OCT system, the lens system comprising a first lens, wherein an aspect of the first lens is adjustable so as render the field of view adjustable without adjusting the scanning range of the scanner, and wherein the optical element is further configured to combine the reference component with a reflected portion of the sample component that reflects off an object placed in the imaging area to produce an interference pattern;
a detector configured to receive the interference pattern; and
a computing system including a processing circuit, the processing circuit including a processor and a memory, the memory being structured to store instructions that are executable by the processor to cause the processor to receive an image signal from the detector and generate an OCT image or depth information based on the image signal.

13. The OCT system of claim 12, wherein the sample arm further includes a beam expander configured to adjust the size of the sample component prior to the sample component reaching the lens system.

14. The OCT system of claim 13, wherein the beam expander includes a first tunable lens disposed proximate to a collimating lens disposed upstream of the scanner and a second tunable lens disposed between the first tunable lens and the scanner, wherein the instructions further cause to processor to provide control signals to the first and second tunable lenses to adjust the focal lengths of the first and second lenses adjust the size of the sample beam.

15. The OCT system of claim 14, wherein the instructions further cause the processor to:
receive an indication that a desired imaging distance of the OCT system is below a first threshold value; and
in response to receiving the indication that the desired imaging distance is below the first threshold value, provide control signals to the first and second tunable lenses such that focal lengths of the first and second tunable lenses both equal a value, wherein the value equals one half of a distance separating the first and second tunable lenses.

16. The OCT system of claim 15, wherein the instructions further cause the processor to:
receive an indication that a desired imaging distance of the OCT system is above a second threshold value; and
in response to receiving the indication that the desired imaging distance is above the second threshold value, provide control signals to the first and second tunable lenses such that the focal length of the first tunable lens decreases from the value by an amount and the focal length of the second tunable lens increases from the value by the amount so as to increase the size of the sample component beam.

17. A method of operating an OCT system,
the OCT system comprising:
a light source configured to generate an optical beam;
an interferometer comprising:
an optical element configured to direct a reference component of the optical beam along a reference arm of the interferometer and a sample component of the optical beam along a sample arm of the interferometer, wherein the sample arm comprises:

a scanner configured to direct the sample component along one of a plurality of different directions within a scanning range; and a lens system disposed downstream of the scanner configured to project the sample beam to an imaging area defined by a field of view of the OCT system, the lens system comprising a first lens, wherein an aspect of the first lens is adjustable so as render the field of view adjustable without adjusting the scanning range of the scanner, and wherein the optical element is further configured to combine the reference component with a reflected portion of the sample component that reflects off an object placed in the imaging area to produce an interference pattern;

a detector configured to receive the interference pattern; and a computing system including a processing circuit, the processing circuit including a processor and a memory, the memory being structured to store instructions that are executable by the processor to cause the processor to receive an image signal from the detector and generate an OCT image or depth information based on the image signal;

the method comprising:

receiving, by the computing device, an indication of a desired imaging distance; and in response to receiving the indication, adjusting, by the computing device, an effective focal length of the lens system disposed downstream of the scanner in the sample arm of the interferometer to simultaneously adjust the field of view and the angular resolution of the OCT system based on the desired imaging distance.

18. The method of claim 17, further comprising:

emitting an optical beam from the light source;

splitting the optical beam via the optical element into the sample beam and the reference beam such that the sample beam is directed to the sample arm;

collimating, by the first lens, the sample beam such that the sample beam is of a first diameter;

directing, by the scanner and the lens system, the sample optical beam to an object placed in the imaging area to generate a reflected beam that reflects off the object;

combining, by the optical element, the reference beam and the reflected beam to generate the interference pattern; and directing, by an optical fiber, the interference pattern to the detector to generate the image signal of the object.

19. The method of claim 18, further comprising:

in response to receiving the indication, adjusting, by the computing device, the focal lengths of a first tunable lens and a second tunable lens of a beam expander disposed downstream of the first lens and upstream of the scanner to adjust a Rayleigh length of the sample beam based on the desired imaging distance.

20. The method of claim 19, further comprising:

determining, by the computing device, that the desired imaging distance is above a threshold; and in response to the determination, adjusting the effective focal length of the lens system to a maximum value so as to maximize the Rayleigh distance of the sample beam.

\* \* \* \* \*